US012666515B2

(12) United States Patent
Fang et al.

(10) Patent No.: US 12,666,515 B2
(45) Date of Patent: Jun. 23, 2026

(54) PROTECTION CIRCUIT FOR MULTI-CHANNEL LED LUMINAIRE

(71) Applicant: SIGNIFY HOLDING B.V., Eindhoven (NL)

(72) Inventors: Yuhong Fang, Naperville, IL (US); Bernd Clauberg, Shaumberg, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 36 days.

(21) Appl. No.: 18/837,676

(22) PCT Filed: Feb. 14, 2023

(86) PCT No.: PCT/EP2023/053621
§ 371 (c)(1),
(2) Date: Aug. 12, 2024

(87) PCT Pub. No.: WO2023/156381
PCT Pub. Date: Aug. 24, 2023

(65) Prior Publication Data

US 2025/0168950 A1 May 22, 2025

(30) Foreign Application Priority Data

Mar. 3, 2022 (EP) .................................... 22159892

(51) Int. Cl.
*H05B 45/30* (2020.01)
*H05B 45/46* (2020.01)
*H05B 45/50* (2022.01)

(52) U.S. Cl.
CPC ............ *H05B 45/50* (2020.01); *H05B 45/46* (2020.01)

(58) Field of Classification Search
CPC ........ H05B 45/10; H05B 45/30; H05B 45/46; H05B 45/50; H05B 47/10
See application file for complete search history.

(56) References Cited

U.S. PATENT DOCUMENTS

2004/0041526 A1 3/2004 Vollrath
2004/0080273 A1 4/2004 Ito et al.
2009/0009088 A1 1/2009 Ito et al.
2013/0016310 A1* 1/2013 Kanemitsu ............ H05B 45/10 349/69
2018/0317292 A1* 11/2018 Katsura ............... H05B 45/397

FOREIGN PATENT DOCUMENTS

DE 10121380 A1 12/2002

* cited by examiner

*Primary Examiner* — Jimmy T Vu

(57) ABSTRACT

A protection circuit for a multi-channel LED luminaire is provided. Each LED channel is powered by a single power supply circuit via a supply signal. In one aspect, a total error circuit compares the total current flowing through each LED channel to a total current limit, and triggers the power supply circuit to adjust the supply signal based on the comparison. This adjustment results in total current flowing through the LED channels to remain constant, while also conforming to the desired lighting output. In another aspect, the comparator circuit compares the total current to the summation of the individual currents flowing through each LED channel to determine if a fault, such as a short circuit, has occurred. Detection of the fault is triggers the power supply to limit or disable the supply signal, limiting damage to the luminaire, and protecting the safety of users.

13 Claims, 3 Drawing Sheets

PROTECTION CIRCUIT FOR MULTI-CHANNEL LED LUMINAIRE

CROSS-REFERENCE TO PRIOR APPLICATIONS

This application is the U.S. National Phase application under 35 U.S.C. § 371 of International Application No. PCT/EP2023/053621, filed on Feb. 14, 2023, which claims the benefit of European Patent Application No. 22159892.3, filed on Mar. 3, 2022, and U.S. Provisional Application No. 63/312,314, filed on Feb. 21, 2022. These applications are hereby incorporated by reference herein.

FIELD OF THE DISCLOSURE

The present disclosure is directed generally to a protection circuit for a multi-channel light emitting diode (LED) luminaire and a multi-channel LED luminaire comprising a protection circuit.

BACKGROUND

Modern luminaires may include several "channels" of light emitting diodes (LEDs). Each LED channel may include a number of LEDs arranged in series or parallel, depending on the application. While in some designs each LED channel is powered by a dedicated power supply circuit, using a single power supply circuit to power all of the LED channels results in a more efficient circuit layout and design. During operation of the multi-channel LED luminaire, the total current through all of the LED channels should be regulated to be constant and to conform with both a desired lighting output (such as a dimming setting) and all applicable safety standards. Further, the current through each individual channel must also be monitored for conformance with safety standards. Accordingly, there is a need in the art for a multi-channel LED luminaire using a single power supply circuit to power a plurality of LED channels with a constant total current, while also monitoring the total current and the individual LED channel currents for conformance with desired lighting output and safety standards.

SUMMARY OF THE DISCLOSURE

The present disclosure is directed generally to a protection circuit for a multi-channel light emitting diode (LED) luminaire and a multi-channel LED luminaire comprising a protection circuit. Each LED channel is powered by a single power supply circuit via a supply signal. In one aspect, a total error circuit compares a total current flowing through both LED channels to a total current limit, and triggers the power supply circuit to adjust the supply signal based on the comparison. This adjustment results in the total current flowing through the LED channels to remain constant, while also conforming to the desired lighting output. In another aspect, a comparator circuit compares the total current to a summation of the individual currents flowing through each LED channel to determine if a fault, such as a short circuit, has occurred. Detection of the fault triggers the power supply to disable the supply signal, limiting damage to the luminaire, and protecting the safety of users.

Generally, in a first aspect, a protection circuit for a multi-channel LED luminaire is provided. The protection circuit includes a first current sensing circuit. The first current sensing circuit is electrically coupled to a first LED channel. The first current sensing circuit is configured to generate a first sensed signal. The first sensed signal corresponds to the first LED channel.

According to an example, the first current sensing circuit includes a first current sensing resistor. The first current sensing resistor is electrically coupled to the first LED channel. The first current sensing circuit further includes a first preamp circuit. The first preamp circuit is configured to generate the first sensed signal by amplifying a first channel signal through the first current sensing resistor.

The protection circuit further includes a second current sensing circuit. The second current sensing circuit is electrically coupled to a second LED channel. The second current sensing circuit is configured to generate a second sensed signal. The second sensed signal corresponds to the second LED channel.

According to an example, the second current sensing circuit includes a second current sensing resistor. The second current sensing resistor is electrically coupled to the second LED channel. The second current sensing circuit further includes a second preamp circuit. The second preamp circuit is configured to generate the second sensed signal by amplifying a second channel signal through the second current sensing resistor.

The protection circuit further includes a total current sensing circuit. The total current sensing circuit is electrically coupled to the first current sensing circuit and the second current sensing circuit. The total current sensing circuit is configured to generate a total sensed signal.

According to an example, the total current sensing circuit includes a total current sensing resistor. The total current sensing resistor is electrically coupled to the first LED channel and the second LED channel. The total current sensing circuit further includes a total preamp circuit. The total preamp circuit is configured to generate the total sensed signal by amplifying a total channel signal through the second current sensing resistor.

The protection circuit further includes a total error circuit. The total error circuit is configured to generate a total error signal based on the total sensed signal and a total current limit signal. The total error signal triggers a power supply circuit to adjust a supply signal provided to the first LED channel or the second LED channel. The total current limit signal may be adjustable via a control circuit.

According to an example, the protection circuit further includes a summing circuit. The summing circuit is configured to generate a combined channel signal. The combined channel signal is based on the first sensed signal, the second sensed signal, and an offset signal.

In this example, the protection circuit further includes a comparator circuit. The comparator circuit is configured to generate a comparison signal. The comparison signal is based on the combined channel signal and the total sensed signal. The power supply circuit limits or disables the supply signal based on the comparison signal.

In this example, the protection circuit further includes a first error circuit. The first error circuit is configured to generate a first error signal. The first error signal is based on the first sensed signal and a safety limit signal. The first error signal triggers the power supply circuit to adjust the supply signal.

According to a further example, the safety limit signal is determined based on a power cut circuit and the supply signal. The power cut circuit may include a power cut limit. The power cut limit may be approximately 100 W.

According to a further example, the protection circuit may further include a second error circuit. The second error circuit is configured to generate a second error signal. The second error signal is based on the second sensed signal and a safety limit signal. The second error signal triggers the power supply circuit to adjust the supply signal.

Generally, in another aspect, a multi-channel LED luminaire is provided. The multi-channel LED luminaire includes a power supply circuit. The power supply circuit is configured to generate a supply signal.

The multi-channel LED luminaire further includes a first LED channel. The first LED channel includes one or more first LEDs. The first LED channel is configured to receive the supply signal. At least two LEDs of the first LED channel may be arranged in series. At least two LEDs of the first LED channel may be arranged in parallel.

The multi-channel LED luminaire further includes a second LED channel. The second LED channel includes one or more second LEDs. The second LED channel is configured to receive the supply signal.

The multi-channel LED luminaire further includes a first current sensing circuit. The first current sensing circuit is electrically coupled to the first LED channel. The first current sensing circuit is configured to generate a first sensed signal. The first sensed signal corresponds to the first LED channel.

The multi-channel LED luminaire further includes a second current sensing circuit. The second current sensing circuit is electrically coupled to the second LED channel. The second current sensing circuit is configured to generate a second sensed signal. The second sensed signal corresponds to the second LED channel.

The multi-channel LED luminaire further includes a total current sensing circuit. The total current sensing circuit is electrically coupled to the first current sensing circuit and the second current sensing circuit. The total current sensing circuit is configured to generate a total sensed signal.

The multi-channel LED luminaire further includes a total error circuit. The total error circuit is configured to generate a total error signal based on the total sensed signal and a total current limit signal. The power supply circuit is configured to adjust the supply signal based on the total error signal.

According to an example, the multi-channel LED luminaire further includes a summing circuit. The summing circuit is configured to generate a combined channel signal. The combined channel signal is based on the first sensed signal, the second sensed signal, and an offset signal.

Further to this example, the multi-channel LED luminaire further includes a comparator circuit. The comparator circuit is configured to generate a comparison signal. The comparison signal is based on the combined channel signal and the total sensed signal. The power supply circuit limits or disables the supply signal based on the comparison signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1:
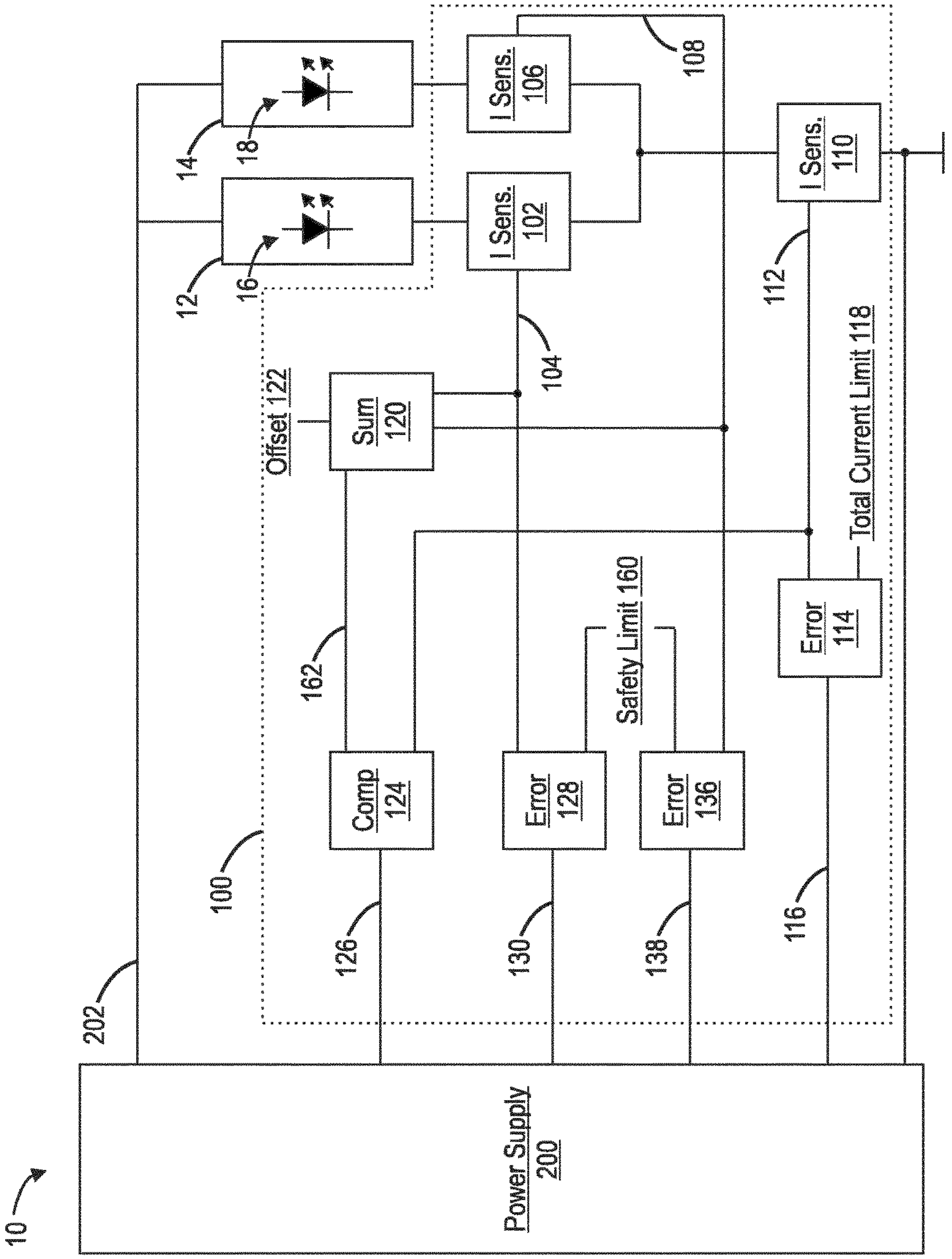
FIG. 1 is a functional block diagram of an example multi-channel light emitting diode (LED) luminaire, in accordance with aspects of the present disclosure.

The present disclosure is directed generally to a protection circuit for a multi-channel light emitting diode (LED) luminaire and a multi-channel LED luminaire comprising a protection circuit. Each LED channel is powered by a single power supply circuit via a supply signal. In one aspect, the protection circuit includes a total error circuit comparing a total current flowing through both LED channels to a total current limit, and triggers the power supply circuit to adjust the supply signal based on the comparison. This adjustment results in total current flowing through the LED channels to remain constant, while also conforming to the desired lighting output. In another aspect, the protection circuit also includes a comparator circuit comparing the total current to a summation of the individual currents flowing through each LED channel to determine if a fault, such as a short circuit, has occurred. Detection of the fault triggers the power supply to disable the supply signal, limiting damage to the luminaire, and protecting the safety of users.

In the first aspect, a first current sensing circuit is coupled to a first LED channel, while a second current sensing circuit is coupled to a second LED channel. In some examples, each current sensing circuit includes a current sensing resistor arranged in series with the LED channel. The current sensing resistor generates a channel signal corresponding to the current flowing through the LED channel. In some examples, the channel signal is amplified by a preamp circuit for easier processing at subsequent stages.

Further, the first and second current sensing circuits are coupled to a total current sensing circuit. The total current sensing circuit includes a total current sensing resistor arranged in series with the parallel combination of the first and second current sensing resistors. The total current sensing resistor generates a total sensed signal corresponding to the total current flowing through the LED channels. In some examples, the total channel signal is amplified by a preamp circuit for easier processing at subsequent stages.

The total channel signal is then provided to a total error circuit. The total error circuit generates a total error signal based on a comparison of the total channel signal to a total current limit. The total current limit may be preset during manufacturing, or it may be adjusted during operation, such as by a dimmer switch. The power supply circuit then adjusts the supply signal according to a total error signal generated by the total error circuit to ensure the total current through the LED channels does not exceed the total current limit.

In some examples, the protection circuit also includes error circuits for each individual LED channel. Each error circuit compares the current (as measured by the corresponding sensing resistor) through an LED channel to a safety limit. The safety limit is determined by a power cut circuit coupled to the supply signal. The power cut circuit includes a power cut limit, such as 100 W. The power cut circuit determines the current of the safety limit based on the voltage of the supply signal and the power cut limit. If the current flowing through any one of the LED channels is greater than the current of the safety limit, the error circuit triggers the power supply circuit to adjust the supply signal such that the current through each LED channel does not exceed the safety limit.

In the second aspect, a summing circuit sums the output of the first current sensing circuit, the output of the second current sensing circuit, and an offset signal. The summed signal is provided to a comparator circuit, which compares the summed signal with the total sensed signal generated by the total current sensing circuit. If the current of the total sensed signal is greater than the current of the summed signal, a fault is present, and the comparator will trigger the power supply circuit to disable the supply signal.

FIG. 1 is a functional block diagram of aspects of an example multi-channel LED luminaire 10. The multi-channel LED luminaire 10 broadly includes a power supply circuit 200, a protection circuit 100, first LED channel 12, and a second LED channel 14. The first LED channel 12 includes one or more first LEDs 16. The first LEDs 16 may be arranged in any combination of series and/or parallel arrangements appropriate for a given implementation. Similarly, the second LED channel 14 includes one or more second LEDs 18. The second LEDs 18 may be arranged in any combination of series and/or parallel arrangements appropriate for a given implementation. Additional LED channels may be used according to the given implementation.

The protection circuit 100 includes a first current sensing circuit 102 electrically coupled to the first LED channel 12. The first current sensing circuit 102 is configured to generate a first sensed signal 104 corresponding to the current flowing through the first LED channel 12. Similarly, the protection circuit 100 also includes a second current sensing circuit 106 electrically coupled to the second LED channel 14. The second current sensing circuit 106 is configured to generate a second sensed signal 108 corresponding to the current flowing through the second LED channel 14.

A total current sensing circuit 110 is electrically coupled to both the first current sensing circuit 102 and the second current sensing circuit 106. The total current sensing circuit 110 is configured to generate a total sensed signal 112. Further details regarding components and circuitry comprising the first current sensing circuit 102, the second current sensing circuit 106, and the total current sensing circuit 110 are described below with reference to FIG. 2.

The total sensed signal 112 is provided to a total error circuit 114. The total error circuit 114 is configured to generate a total error signal 116 corresponding to the difference between the total sensed signal 112 and a total current limit signal 118. In some examples, the total current limit signal 118 may correspond to a desired lighting output, such as LED brightness.

The total current limit signal 118 may be generated in a variety of ways. In some examples, the total current limit signal 118 may be generated by hard-wired circuitry of the protection circuit 100. In other examples, the total current limit signal 118 may be set by user- or manufacturer-adjustable circuitry, such as dimmer circuitry. In further examples, the total current limit signal 118 may be generated through software implemented by a processor and a memory storing data corresponding to one or more values of the total current limit signal 118.

The total error signal 116 is provided to the power supply circuit 200. Upon receiving the total error signal 116, the power supply circuit 200 regulates the supply signal 202 according to the total error signal 116. In one example, if the total error signal 116 indicates that the current of the total sensed signal 112 surpasses the current of the total current limit signal 118, the power supply circuit 200 reduces the current and/or voltage of the supply signal 202.

In some examples, the protection circuit 100 further includes a first error circuit 128. The first error circuit 128 is arranged to receive the first sensed signal 104 generated by the first current sensing circuit 102. The first error circuit 128 is also arranged to receive a safety limit signal 160. This safety limit signal 160 may correspond to an industry standard, such as the Class 2 limit set by Underwriters Laboratories® (UL). In one example, this safety limit signal 160 may correspond to an output power of 100 W. The first error circuit 128 is configured to generate a first error signal 130 corresponding to the difference between the first sensed signal 104 and the safety limit signal 160. The first error signal 130 is provided to the power supply circuit 200. Upon receiving the first error signal 130, the power supply circuit 200 regulates the supply signal 202 according to the first error signal 130. For example, if the first error signal 130 indicates the current of the first sensed signal 104 exceeds the current of the safety limit signal 160, the power supply circuit 200 may reduce the current and/or voltage of the supply signal 202 to prevent damage to aspects of the multi-channel LED luminaire 10, such as the first LED channel 12. In this way, the power supply circuit 200 uses the first error signal 130 to conform to safety standards and prevent dangerous overcurrent conditions.

In some examples, the protection circuit 100 further includes a second error circuit 136. Like the first error circuit 128, the second error circuit 136 is arranged to receive the second sensed signal 108 (generated by the second current sensing circuit 106) and the safety limit signal 160. The second error circuit 136 is configured to generate a second error signal 138 corresponding to the difference between the second sensed signal 108 and the safety limit signal 160. Upon receiving the second error signal 138, the power supply circuit 200 regulates the supply signal 202 according to the second error signal 138. Additional error circuits configured to compare the current through additional LED channels to the safety limit signal 160 may be implemented where appropriate.

In some examples, the protection circuit 100 further includes a comparator circuit 124. The comparator circuit 124 is used to detect faults within the multi-channel LED luminaire 10, such as short circuits. The comparator circuit 124 is configured to receive the total sensed signal 112 (generated by the total current sensing circuit 110) and a combined channel signal 162. The combined channel signal 162 is generated by a summing circuit 120. The summing circuit 120 combines the first sensed signal 104, the second sensed signal 108, and an offset signal 122.

In normal operation, the sum of the current of the first sensed signal 104 and the current of the second sensed signal 106 should equal the current of the total sensed signal 110. However, if a fault condition occurs, such as a short in the first current sensing circuit 102 or the second current sensing circuit 106, the sum of the current of the first sensed signal 104 and the current of the second sensed signal 106 will be less than the current of the total sensed signal 110.

The comparator circuit 124 generates a comparison signal 126 based on the combined channel signal 162 and the total sensed signal 112. In some examples, the comparison signal 126 is set to a high voltage if the current of the combined channel signal 162 is greater than the current of the total sensed signal 112, and set to a low voltage if not. Thus, if the current of the combined channel signal 162 decreases significantly while the current of total sensed signal 112 remain substantially unchanged, the comparison signal 126 switches from high voltage to low voltage, indicative of a fault condition. The comparison signal 126 is provided to the power supply circuit 200. Upon receiving the comparison signal 126, the power supply circuit 200 may disable the supply signal 202 (or trigger other protective measures) if the comparison signal 126 is indicative of a fault condition.

The offset signal 122 is used to ensure that the supply signal 202 is not triggered during normal operation. In some examples without the offset signal 122, small variations in the current flowing through the first LED channel 12 or the second LED channel 14 could trigger the comparator signal 126 to rapidly switch between high voltage and low voltage, thereby rapidly enabling and disabling the supply signal 202. To prevent this situation from occurring, the summing circuit 120 adds the offset signal 122 to the first sensed signal 104 and the second sensed signal 108 to generate a combined channel signal 162 of significantly higher current than the current of the total sensed signal 112. Thus, the comparator circuit 124 will only switch the comparison signal 126 from high voltage to low voltage due to significant changes in the current flowing through the first LED channel 12 and/or the second LED channel 14 or changes that exceed a predetermined threshold in the current flowing through the first LED channel 12 and/or the second LED channel 14. The offset signal 122 may be generated by an offset circuit including one or more discrete and/or integrated components.

Figure 2:
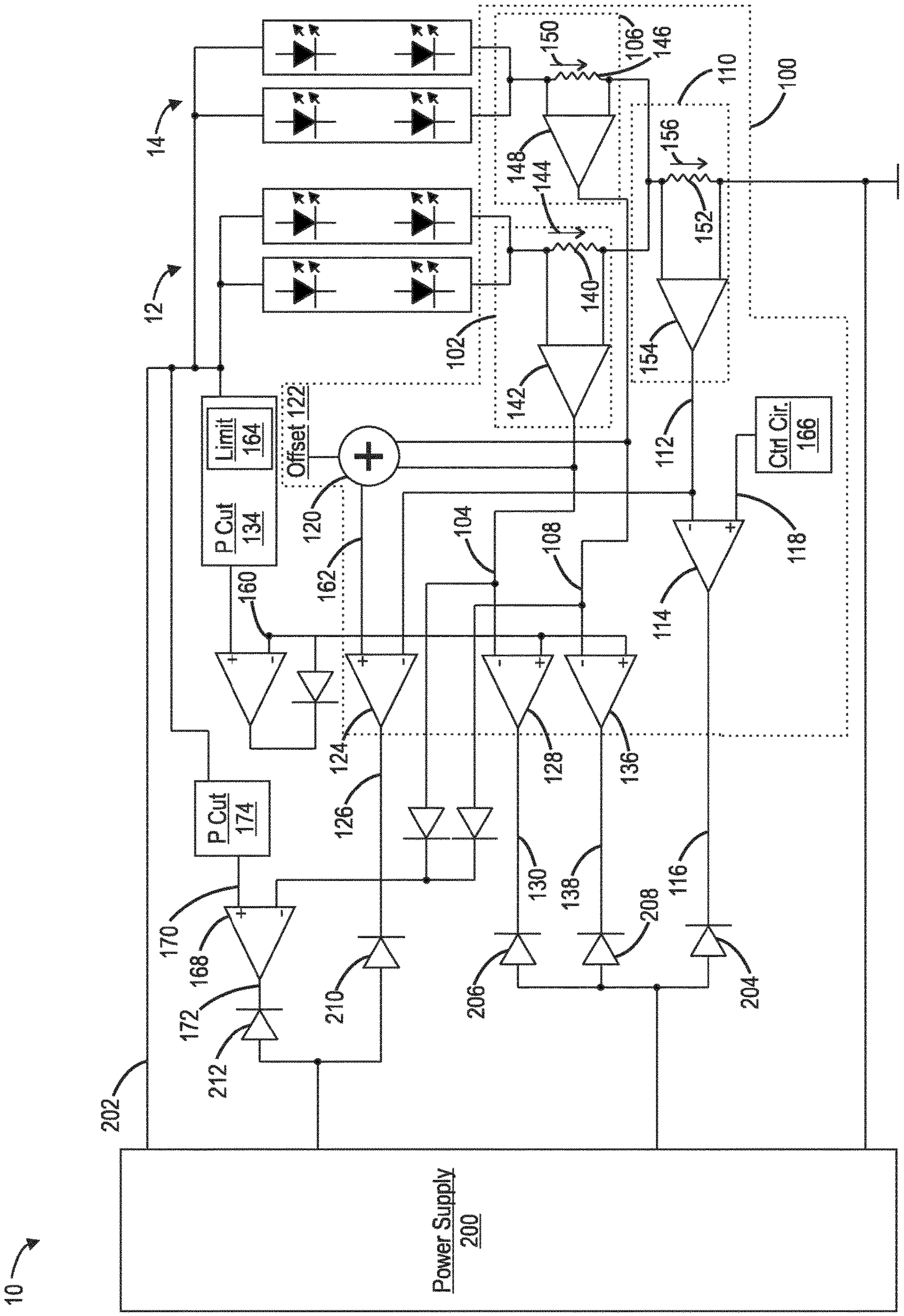
FIG. 2 is a circuit schematic of an example multi-channel LED luminaire, in accordance with aspects of the present disclosure.

FIG. 2 is a circuit schematic of aspects of a multi-channel light emitting diode (LED) luminaire 10. As with FIG. 1, the multi-channel LED luminaire 10 broadly includes a power supply circuit 200, a protection circuit 100, a first LED channel 12, and a second LED channel 14. In the example of FIG. 2, the first LED channel 12 includes two LED subchannels arranged in parallel to each other. Each first LED subchannel may include two or more LEDs 16 in any combination of series and/or parallel arrangements. Similarly, the second LED channel 14 also includes two LED subchannels arranged in parallel. Each second LED subchannel may include two or more LEDs 18 in any combination of series and/or parallel arrangements.

The protection circuit 100 of FIG. 2 shows a more detailed depiction of the first current sensing circuit 102, the second current sensing circuit 106, and the total current sensing circuit 110. In this example, the first current sensing circuit 102 includes a first current sensing resistor 140 arranged in series with the first LED channel 12. Accordingly, the first current sensing resistor 140 generates a first channel signal 144 with a current corresponding to the total current flowing through the first LED channel 12. In this example, the first channel signal 140 is then amplified by a first preamp circuit 142 to generate the first sensed signal 104. A person having ordinary skill in the art would appreciate that the first preamp circuit 142, as with the other preamp circuits described below, is depicted as an operational amplifier for simplicity. The first preamp circuit 142 may also include additional components, such as resistors, including feedback resistors.

The second current sensing circuit 106 includes a second current sensing resistor 146 arranged in series with the second LED channel 14. Accordingly, the second current sensing resistor 146 generates a second channel signal 150 with a current corresponding to the total current flowing through the second LED channel 14. In this example, the second channel signal 150 is then amplified by the second preamp circuit 148 to generate the first sensed signal 108.

The total current sensing circuit 110 includes a total current sensing resistor 152 arranged in series with the parallel combination of the first current sensing resistor 140 and the second current sensing resistor 146. Accordingly, the total current sensing resistor 152 generates a total channel signal 156 with a current corresponding to the sum of the currents of the first channel signal 144 and the second channel signal 150, therefore corresponding to the total current flowing through both the first LED channel 12 and the second LED channel 14. In this example, the total channel signal 156 is then amplified by the total preamp circuit 154 to generate the total sensed signal 112.

As with FIG. 1, the total sensed signal 112 is provided to a total error circuit 114. A person having ordinary skill in the art would appreciate that the total error circuit 114, as with the other error circuits described below, is depicted as an operational amplifier for simplicity. The total error circuit 114 may also include additional components, such as resistors, including feedback resistors.

The total error circuit 114 generates a total error signal 116 corresponding to the difference between the total sensed signal 112 and a total current limit signal 118. In the example depicted in FIG. 2, the total current limit signal 118 is set by a control circuit 166. In one example, the control circuit 116 may be hardwired to generate a constant total current limit signal 118. In other examples, the control circuit 166 may adjust the total current limit signal 118 according to an input, such as from a dimmer switch. In further examples, the control signal 116 may include (or be communicatively coupled to) a processor and a memory. In these further examples, the control signal 166 may generate the total current limit signal 118 via software implemented by the processor using data stored in the memory. The total error signal 116 is then provided to the power supply circuit 200 via diode 204. As described with respect to FIG. 1, the power supply circuit 200 then adjusts the supply signal 202 according to the received total error signal 116.

The protection circuit 100 shown in FIG. 2 also includes a first error circuit 128 and a second error circuit 136. In this example, the first error circuit 128 receives the first sensed signal 104, and the second error circuit 136 receives the second sensed signal 108. Further, the first error circuit 128 and the second error circuit 136 each also received a safety limit signal 160. In this example, the safety limit signal 160 is generated by a power cut circuit 134. The power cut circuit 134 generates a safety limit signal 160 with a current determined based on the voltage of the supply signal 202 and the value of the power cut limit 164 of the power cut circuit 134. The power cut limit 164 may correspond to a UL Class 2 limit, such as 100 W. Accordingly, power cut circuit 134 may then determine the maximum current which may flow through the LED channels 12, 14 by dividing the power cut limit 134 by the voltage of the supply signal 202.

The first error circuit 128 generates a first error signal 130 corresponding to the difference between the first sensed signal 104 and the safety limit signal 160. Similarly, the second error circuit 136 generates a second error signal 138 corresponding to the difference between the first sensed signal 104 and the safety limit signal 160. The first error signal 130 is then provided to the power supply circuit 200 via diode 206, and the second error signal 138 is provided to the power supply circuit 200 via diode 208. The power supply circuit 200 may then regulate the supply signal 202 according to the received first error signal 130 and/or the received second error signal 138.

In some examples, the protection circuit 100 further includes a comparator circuit 124. A person having ordinary skill in the art would appreciate that the comparator circuit 124 is depicted as an operational amplifier for simplicity. The comparator circuit 124 may also include additional components, such as resistors, including feedback resistors. The comparator circuit 124 receives the total sensed signal 112 and a combined channel signal 162.

The combined channel signal 162 is generated by summing circuit 120. A person of ordinary skill in the art would understand that the summing circuit 120 may be an operational amplifier circuit including additional components, such as feedback resistors or input resistors. The summing circuit 120 combines the first sensed signal 104, the second sensed signal 108, and an offset signal 122.

The comparator circuit 124 then generates a comparison signal 126 based on the combined channel signal 162 and the total sensed signal 112. This comparison signal 124 is then provided to the power supply circuit 200 via diode 210. The power supply circuit 200 may then disable the supply signal 202 if the comparison signal 126 indicates a fault condition has occurred.

In some examples, the multi-channel LED luminaire 10 may also include a second power cut circuit 174. The second power cut circuit 174 works as a backup to power cut circuit 134. The second power cut circuit 174 generates a backup safety limit signal 170 based on the voltage of the supply signal 202 and a backup power cut limit (such as 100 W) associated with the second power cut circuit 174. A backup error circuit 168 then receives the backup safety limit signal 170 along with the first sensed signal 104 and/or the second sensed signal 108. The backup error circuit 168 then generates a backup error signal 172 corresponding to the difference of the received signals. The backup error signal 172 is then provided, via diode 212, to the power supply circuit 200. As with the previously mentioned error signals, the power supply circuit 200 may then regulate the supply signal 202 based on the backup error signal 172. Thus, the second power cut circuit 174 and the backup error circuit 168 provide additional fault protection if the power cut circuit 134, the first error circuit 128, and/or the second error circuit 136 should fail.

Figure 3:
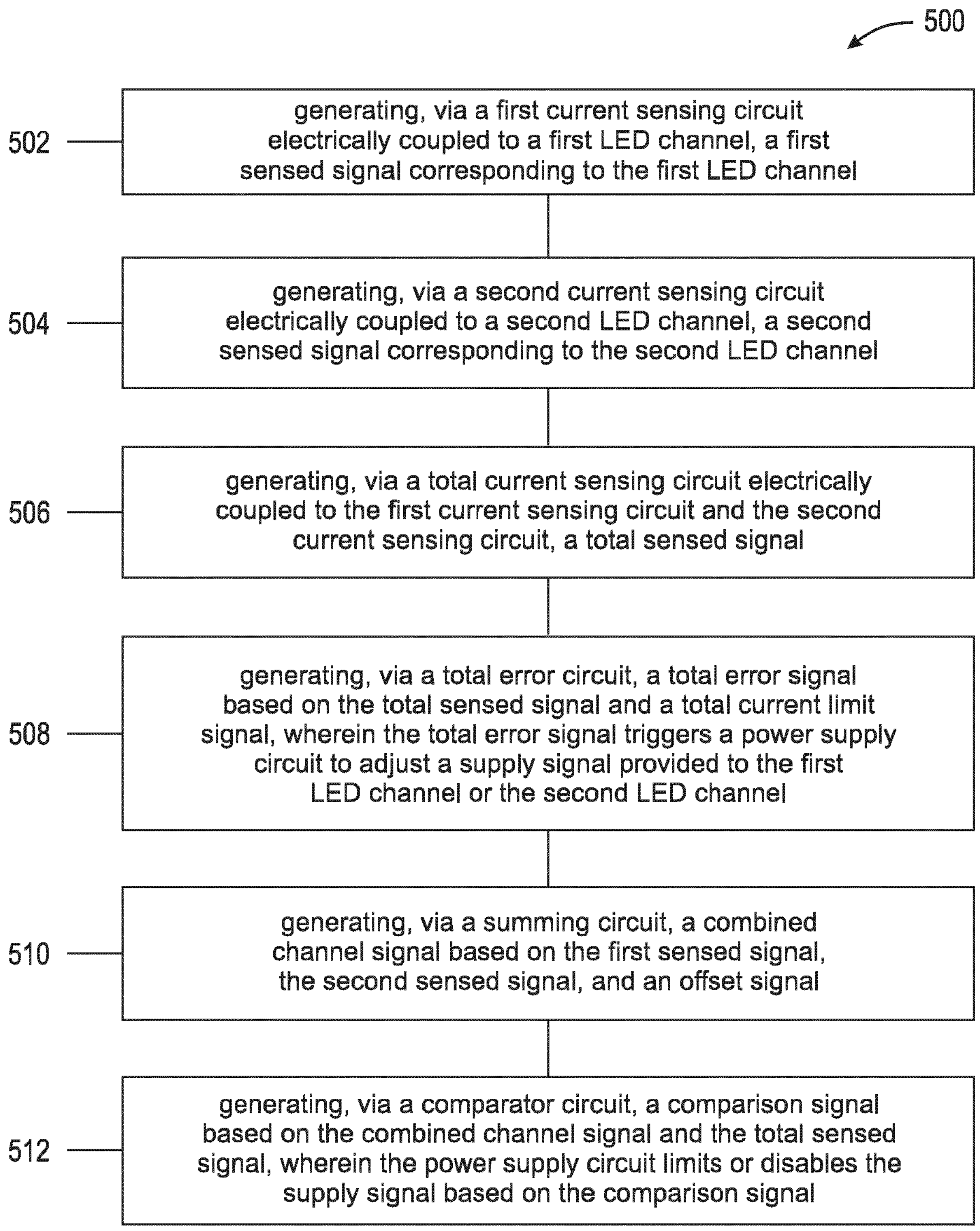
FIG. 3 is a flowchart of a method for protecting a multi-channel LED luminaire, in accordance with aspects of the present disclosure.

FIG. 3 is a flowchart of a method 500 for protecting a multi-channel LED luminaire. The method 500 includes generating 502, via a first current sensing circuit electrically coupled to a first LED channel, a first sensed signal corresponding to the first LED channel. The method 500 further includes generating 504, via a second current sensing circuit electrically coupled to a second LED channel, a second sensed signal corresponding to the second LED channel. The method 500 further includes generating 506, via a total current sensing circuit electrically coupled to the first current sensing circuit and the second current sensing circuit, a total sensed signal. The method 500 further includes generating 508, via a total error circuit, a total error signal based on the total sensed signal and a total current limit signal, wherein the total error signal triggers a power supply circuit to adjust a supply signal provided to the first LED channel or the second LED channel.

Further, the method 500 may also include generating 510, via a summing circuit, a combined channel signal based on the first sensed signal, the second sensed signal, and an offset signal. The method 500 may also include generating 512, via a comparator circuit, a comparison signal based on the combined channel signal and the total sensed signal, wherein the power supply circuit limits or disables the supply signal based on the comparison signal.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A protection circuit for a multi-channel light emitting diode luminaire, comprising:

a first current sensing circuit electrically coupled to a first LED channel, the first current sensing circuit configured to generate a first sensed signal corresponding to the first LED channel;

a second current sensing circuit electrically coupled to a second LED channel, the second current sensing circuit configured to generate a second sensed signal corresponding to the second LED channel;

a total current sensing circuit electrically coupled to the first current sensing circuit and the second current sensing circuit, the total current sensing circuit configured to generate a total sensed signal;

a total error circuit configured to generate a total error signal based on the total sensed signal and a total current limit signal, wherein the total error signal triggers a power supply circuit to adjust a supply signal provided to the first LED channel or the second LED channel;

a summing circuit configured to generate a combined channel signal based on the first sensed signal, the second sensed signal, and an offset signal; and a comparator circuit configured to generate a comparison signal based on the combined channel signal and the total sensed signal, wherein the power supply circuit limits or disables the supply signal based on the comparison signal.

2. The protection circuit of claim 1, further comprising a first error circuit configured to generate a first error signal based on the first sensed signal and a safety limit signal, wherein the first error signal triggers the power supply circuit to adjust the supply signal.

3. The protection circuit of claim 2, wherein the safety limit signal is determined based on a power cut circuit and the supply signal.

4. The protection circuit of claim 3, wherein the power cut circuit comprises a power cut limit.

5. The protection circuit of claim 4, wherein the power cut limit is approximately 100 W.

6. The protection circuit of claim 2, further comprising a second error circuit configured to generate a second error signal based on the first sensed signal and a safety limit signal, wherein the second error signal triggers the power supply circuit to adjust the supply signal.

7. The protection circuit of claim 1, wherein the first current sensing circuit comprises:

a first current sensing resistor electrically coupled to the first LED channel; and a first preamp circuit configured to generate the first sensed signal by amplifying a first channel signal through the first current sensing resistor.

8. The protection circuit of claim 1, wherein the second current sensing circuit comprises:

a second current sensing resistor electrically coupled to the second LED channel; and a second preamp circuit configured to generate the second sensed signal by amplifying a second channel signal through the second current sensing resistor.

9. The protection circuit of claim 1, wherein the total current sensing circuit comprises:

a total current sensing resistor electrically coupled to the first LED channel and the second LED channel; and a total preamp circuit configured to generate the total sensed signal by amplifying a total channel signal through the second current sensing resistor.

10. The protection circuit of claim 1, wherein the total current limit signal is adjustable via a control circuit.

11. The protection circuit for a multi-channel light emitting diode luminaire of claim 1, further comprising a power supply circuit configured to generate the supply signal.

12. The protection circuit for a multi-channel LED luminaire of claim 11, wherein at least two LEDs of the first LED channel are arranged in series.

13. The protection circuit for a multi-channel LED luminaire of claim 11, wherein at least two LEDs of the first LED channel are arranged in parallel.

* * * * *